United States Patent
Matsuo et al.

(10) Patent No.: US 9,811,450 B2
(45) Date of Patent: Nov. 7, 2017

(54) SEMICONDUCTOR TEST APPARATUS FOR CONTROLLING TESTER

(71) Applicant: RENESAS ELECTRONICS CORPORATION, Kawasaki-shi, Kanagawa (JP)

(72) Inventors: Yukikazu Matsuo, Itami (JP); Yasuyuki Tanaka, Itami (JP); Masaru Sugimoto, Kawasaki (JP); Kyosaku Nobunaga, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 688 days.

(21) Appl. No.: 14/265,068

(22) Filed: Apr. 29, 2014

(65) Prior Publication Data

US 2014/0325191 A1    Oct. 30, 2014

(30) Foreign Application Priority Data

Apr. 30, 2013  (JP) .................................. 2013-095289

(51) Int. Cl.
  *G06F 11/36*  (2006.01)
  *G06F 11/22*  (2006.01)
(52) U.S. Cl.
  CPC .......... *G06F 11/3688* (2013.01); *G06F 11/22* (2013.01); *G06F 11/3656* (2013.01)
(58) Field of Classification Search
  None
  See application file for complete search history.

(56) References Cited

U.S. PATENT DOCUMENTS

| 7,203,873 B1 * | 4/2007 | Adams ............... G11C 29/1201 714/31 |
| 2008/0059108 A1 * | 3/2008 | Gil ................... G01R 31/31907 702/121 |
| 2011/0181311 A1 | 7/2011 | Hiraide et al. |

FOREIGN PATENT DOCUMENTS

| JP | 2004-144488 A | 5/2004 |
| JP | 2004-171659 A | 6/2004 |
| JP | 2009-229331 A | 10/2009 |
| JP | 2011-154026 A | 8/2011 |

OTHER PUBLICATIONS

Japanese Office Action dated Nov. 22, 2016 issued in Japanese Patent Application No. 2013-095289 with English translation.
Taiwanese Office Action dated May 4, 2017 issued in Taiwanese Patent Application No. 103114420 (with English translation).

* cited by examiner

*Primary Examiner* — John Lindlof
(74) *Attorney, Agent, or Firm* — McDermott Will & Emery LLP

(57) ABSTRACT

A tester instruction generation unit generates a tester instruction for terminals of a plurality of devices connected to a tester based on an instruction of a user program and causes an instruction storage unit to store the tester instruction. A transfer mode setting unit sets a transfer mode to either a successive transfer mode or a batch transfer mode, based on the number of tester instructions in the instruction storage unit or an instruction of the user program. A transfer control unit transmits the tester instruction in the instruction storage unit to the tester in accordance with the set transfer mode.

6 Claims, 16 Drawing Sheets

| NUMBER OF DEVICE DUT | PORT NUMBER | ADDRESS OF REGISTER OF TESTER | WRITE DATA |
|---|---|---|---|

FIG.8A

```
int main()
{
    POWER ON;
    TEST 1 (FUNCTION TEST);
    TEST 2 (TUNING);
    TEST 3 (DC TEST);
    TEST 4 (Flash TEST);
        :
    (OMITTED)
        :
    POWER OFF;
}
```

FIG.8B

```
TEST 1 (FUNCTION TEST)
{
    VOLTAGE SETTING 1;
    TIMING SETTING 1;
    PIN SETTING 1;
    RELAY SETTING 1;
    PATTERN EXECUTION 1;
}
```

FIG.8C

```
TEST 4 (Flash TEST)
{
    VOLTAGE SETTING 4;
    TIMING SETTING 4;
    PIN SETTING 4;
    RELAY SETTING 4;
    PATTERN EXECUTION 4;
}
```

FIG.9

| NUMBER OF DEVICE DUT | PORT NUMBER | ADDRESS OF REGISTER OF TESTER | WRITE DATA | |
|---|---|---|---|---|
| 1 | 1 | 0x00001d | WA | |
| . | 2 | 0x00001d | WA | |
| . | . | 0x00001d | . | |
| . | m | 0x00001d | WA | |
| 2 | 1 | 0x00001d | WA | |
| . | 2 | 0x00001d | WA | |
| . | . | 0x00001d | . | n×m |
| . | m | 0x00001d | WA | |
| n | 1 | 0x00001d | WA | |
| . | 2 | 0x00001d | WA | |
| . | . | 0x00001d | . | |
| . | m | 0x00001d | WA | |
| 1 | 1 | 0x00001d | WB | |
| . | 2 | 0x00001d | WB | |
| . | . | 0x00001d | . | |
| . | m | 0x00001d | WB | |
| 2 | 1 | 0x00001d | WB | |
| . | 2 | 0x00001d | WB | |
| . | . | 0x00001d | . | n×m |
| . | m | 0x00001d | WB | |
| n | 1 | 0x00001d | WB | |
| . | 2 | 0x00001d | WB | |
| . | . | 0x00001d | . | |
| . | m | 0x00001d | WB | |
| 1 | 1 | 0x00001d | WC | |
| . | 2 | 0x00001d | WC | |
| . | . | 0x00001d | . | |
| . | m | 0x00001d | WC | |
| 2 | 1 | 0x00001d | WC | |
| . | 2 | 0x00001d | WC | |
| . | . | 0x00001d | . | n×m |
| . | m | 0x00001d | WC | |
| n | 1 | 0x00001d | WC | |
| . | 2 | 0x00001d | WC | |
| . | . | 0x00001d | . | |
| . | m | 0x00001d | WC | |

FIG.10

| NUMBER OF DEVICE DUT | PORT NUMBER | ADDRESS OF REGISTER OF TESTER | WRITE DATA | |
|---|---|---|---|---|
| 1 | 1 | 0x00001d | WA | |
| · | 2 | 0x00001d | WA | |
| · | · | 0x00001d | · | |
| · | m | 0x00001d | WA | |
| 2 | 1 | 0x00001d | WA | |
| · | 2 | 0x00001d | WA | |
| · | · | 0x00001d | · | $(n-5) \times m$ |
| · | m | 0x00001d | WA | |
| n | 1 | 0x00001d | WA | |
| · | 2 | 0x00001d | WA | |
| · | · | 0x00001d | · | |
| · | m | 0x00001d | WA | |
| 1 | 1 | 0x00001d | WB | |
| · | 2 | 0x00001d | WB | |
| · | · | 0x00001d | · | |
| · | m | 0x00001d | WB | |
| 2 | 1 | 0x00001d | WB | |
| · | 2 | 0x00001d | WB | |
| · | · | 0x00001d | · | $(n-5) \times m$ |
| · | m | 0x00001d | WB | |
| n | 1 | 0x00001d | WB | |
| · | 2 | 0x00001d | WB | |
| · | · | 0x00001d | · | |
| · | m | 0x00001d | WB | |
| 1 | 1 | 0x00001d | WC | |
| · | 2 | 0x00001d | WC | |
| · | · | 0x00001d | · | |
| · | m | 0x00001d | WC | |
| 2 | 1 | 0x00001d | WC | |
| · | 2 | 0x00001d | WC | |
| · | · | 0x00001d | · | $(n-5) \times m$ |
| · | m | 0x00001d | WC | |
| n | 1 | 0x00001d | WC | |
| · | 2 | 0x00001d | WC | |
| · | · | 0x00001d | · | |
| · | m | 0x00001d | WC | |

FIG.12B

TEST 1 (FUNCTION TEST)
{
  VOLTAGE SETTING 1;
  TIMING SETTING 1;
  PIN SETTING 1;
  RELAY SETTING 1;
  PATTERN EXECUTION 1;
}

FIG.12C

TEST 2 (TRIMMING TEST)
{
  VOLTAGE SETTING 2;
  TIMING SETTING 2;
  PIN SETTING 2;
  RELAY SETTING 2;
  ┌─────────────────────────┐ LOOP
  │ CREATE NEW TRIMMING CODE;│
  │ WRITE TRIMMING CODE;     │
  │ PATTERN EXECUTION 2;     │
  │ DC TEST 2;               │
  │ COMPARE MEASUREMENT      │
  │ VALUE WITH TARGET        │
  │ VALUE;                   │
  └─────────────────────────┘
  DETERMINE TRIMMING CODE;
}

FIG.12A

```
int main()
{
  FLAG=ON(BATCH TRANSFER
  SWITCHING INSTRUCTION)
  POWER ON;

TEST 1 (FUNCTION TEST)
  FLAG=OFF(SUCCESSIVE
  TRANSFER SWITCHING
  INSTRUCTION)
  TEST 2(TRIMMING TEST);
  FLAG=ON(BATCH TRANSFER
  SWITCHING INSTRUCTION)
  TEST 3(DC TEST);

TEST 4(SELF TEST);

:
  (OMITTED)
  :

POWER OFF;
  FLAG=OFF(BATCH TRANSFER
  SWITCHING INSTRUCTION)
}
```

FIG.14A

```
int main()
{
    POWER ON;
    TEST 1 (FUNCTION TEST);
    TEST 2 (TRIMMING TEST);
    TEST 3 (DC TEST);
    TEST 4 (SELF TEST);
        :
        (OMITTED)
        :
    POWER OFF;
}
```

FIG.14B

```
TEST 1 (FUNCTION TEST)
{
    VOLTAGE SETTING 1;
    TIMING SETTING 1;
    PIN SETTING 1;
    RELAY SETTING 1;
    PATTERN EXECUTION 1;
}
```

FIG.14C

```
TEST 2 (TRIMMING TEST)
{
    VOLTAGE SETTING 2;
    TIMING SETTING 2;
    PIN SETTING 2;
    RELAY SETTING 2;
        ┌─────────────────────────┐  LOOP
        │ CREATE NEW TRIMMING     │
        │ CODE;                   │
        │ WRITE TRIMMING CODE;    │
        │ PATTERN EXECUTION 2;    │
        │ DC TEST 2;              │
        │ COMPARE MEASUREMENT     │
        │ VALUE WITH TARGET       │
        │ VALUE;                  │
        └─────────────────────────┘
    DETERMINE TRIMMING CODE;
}
```

CONVERT TO TESTER INSTRUCTION INCLUDING BUS READ INSTRUCTION

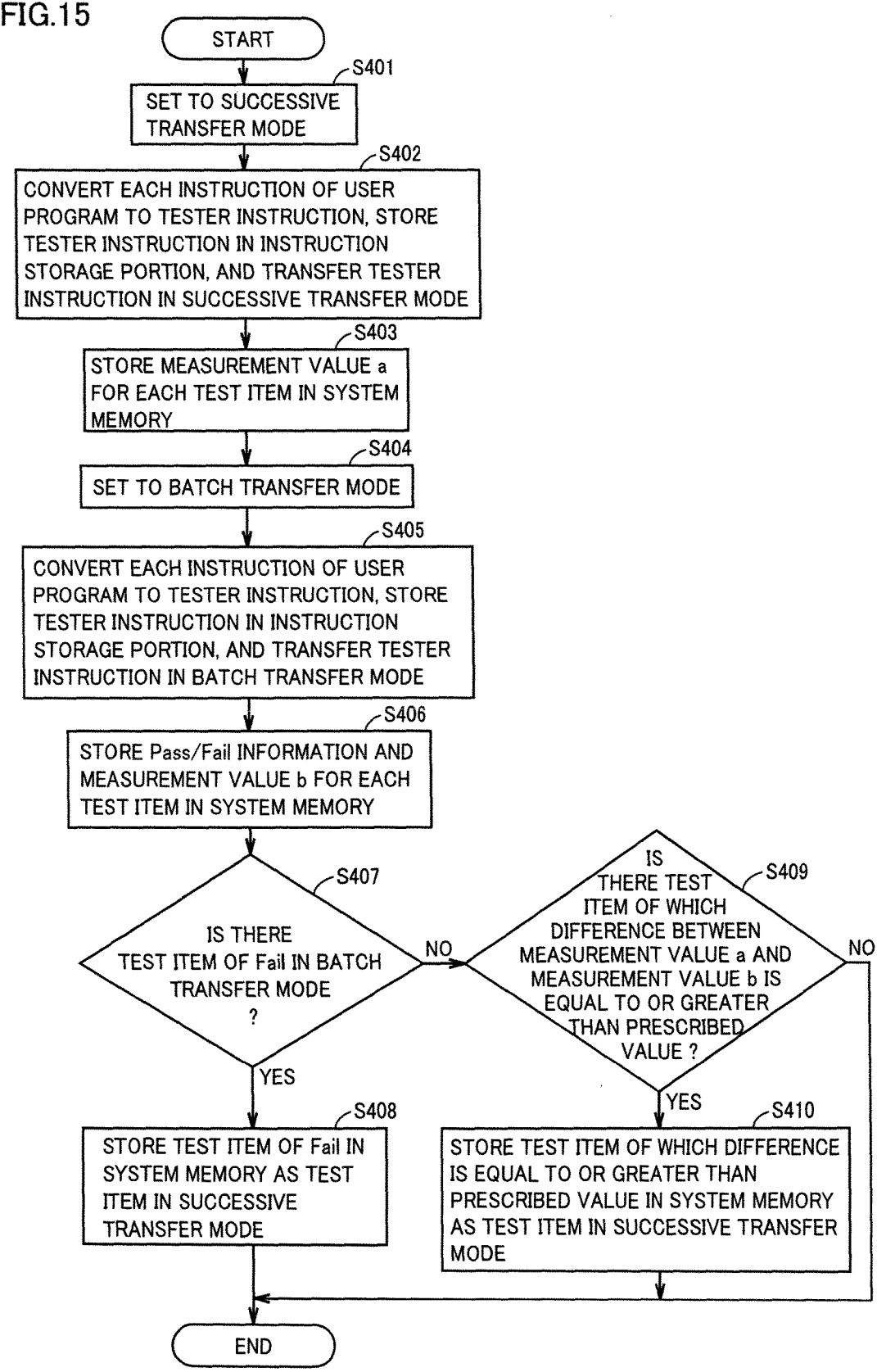

```
int main()
{

POWER ON;

TEST 1 (FUNCTION TEST);

TEST 2 (TRIMMING TEST);

TEST 3 (DC TEST);

TEST 4 (SELF TEST);

:
  (OMITTED)
    :

POWER OFF;

}
```

SEMICONDUCTOR TEST APPARATUS FOR CONTROLLING TESTER

BACKGROUND OF THE INVENTION

Field of the Invention

The present invention relates to a semiconductor test apparatus, and for example, relates to a semiconductor test apparatus controlling a tester to which a plurality of devices are connected.

Description of the Background Art

A semiconductor test apparatus testing a semiconductor device has conventionally been known, For example, in a semiconductor test apparatus according to Japanese Patent Laying-Open No 2004-144488, a pattern feature extraction unit (2) extracts a feature of a test pattern and a pattern conversion unit (3) sorts test patterns in consideration of features of extracted test patterns and outputs the test patterns together with a scrambling code A pattern memory control unit (5) accesses a pattern memory (4), reads the test pattern converted by the pattern conversion unit (3), and transfers only a unit of which transfer is required to a tester control unit (6) The tester control unit (6) reconstitutes the read test pattern based on the scrambling code, generates a test waveform and applies the waveform to a tested LSI, and determines whether or not the tested LSI is good.

SUMMARY OF THE INVENTION

In a conventional semiconductor test apparatus including the semiconductor test apparatus according to Japanese Patent Laying-Open No. 2004-144488, an instruction has been transmitted to a tester in a successive transfer mode. Namely, in view of measurement of output data or the like from a test apparatus, instructions have successively been transferred to a tester and a register in the tester has been set. In this successive transfer mode, a certain time period is disadvantageously required for handshake for transfer of an instruction to the register.

On the other hand, in a batch transfer mode, a register can be set by temporarily storing instructions in a cache and transferring in a batch, instructions in the cache to a register in the tester in response to a prescribed instruction such as pattern start. An instruction which can be transferred in this batch transfer mode is disadvantageously limited to those for which a self test can be conducted in a tested device.

Other features and novel features will be apparent from the description herein and the accompanying drawings.

A semiconductor test apparatus according to one embodiment of the present invention includes a transfer mode setting unit setting a transfer mode to either a successive transfer mode or a hatch transfer mode based on the number of tester instructions in an instruction storage unit or an instruction of a user program and a transfer control unit transmitting the tester instruction in the instruction storage unit to the tester in accordance with the set transfer mode.

According to one embodiment of the present invention, switching between a successive transfer mode and a batch transfer mode can efficiently be made.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8A is a diagram showing an example of a user program.

FIG. 8B is a diagram showing an instruction included in a test 1 which is a function test.

FIG. 8C is a diagram showing an instruction included in a test 2 which is a Flash test (a test of a flash memory).

FIG. 9 is a diagram showing an example of a tester instruction stored in the instruction storage unit when no abnormal device is present.

FIG. 10 is a diagram showing an example of a tester instruction stored in the instruction storage unit when an abnormal device is present.

FIG. 12A is a diagram showing an example of the user program.

FIG. 12B is a diagram showing an example of test 1 included in the user program.

FIG. 12C is a diagram, showing an example of test 2 included in the user program.

FIG. 14A is a diagram showing an example of the user program.

FIG. 14B is a diagram showing an example of test 1 included in the user program.

FIG. 14C is a diagram showing an example of test 2 included in the user program.

FIG. 15 is a flowchart showing a procedure for registering a transfer mode for each test item in the semiconductor test apparatus in a fifth embodiment.

DESCRIPTION OF THE PREFERRED EMBODIMENTS

An embodiment of the present invention will be described hereinafter with reference to the drawings.

[First Embodiment]

Figure 1:
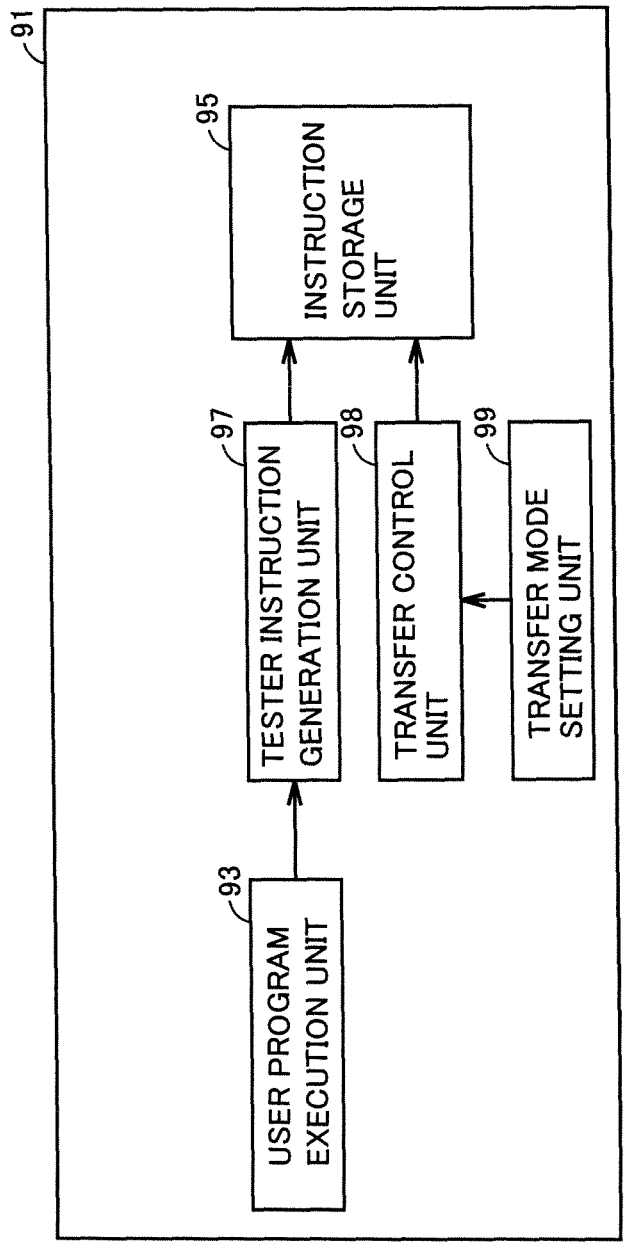
FIG. 1 is a diagram showing a configuration of a semiconductor test apparatus in a first embodiment.

FIG. 1 is a diagram showing a configuration of a semiconductor test apparatus in a first embodiment.

Referring to FIG. 1, this semiconductor test apparatus 91 is a semiconductor test apparatus for controlling a tester to which a plurality of devices are connected. This semiconductor test apparatus 91 includes a user program execution unit 93, a tester instruction generation wilt 97, an instruction storage unit 95, a transfer mode setting unit 99, and a transfer control unit 98.

User program execution unit 93 executes an instruction of a user program.

Tester instruction generation unit 97 generates a tester instruction for terminals of the plurality of devices connected to the tester based on the instruction of the user program and causes instruction storage unit 95 to store the tester instruction.

Instruction storage unit 95 stores the generated tester instruction.

Transfer mode setting unit 99 sets a transfer mode to either a successive transfer mode or a batch transfer mode based on the number of tester instructions in instruction storage unit 95 or the instruction of the user program.

Transfer control unit 98 transmits the tester instruction in instruction storage unit 95 to the tester in accordance with the set transfer mode.

As above, according to the present embodiment, a mode for transferring the tester instruction from the semiconductor test apparatus to the tester can efficiently be switched between the successive transfer mode and the batch transfer mode.

[Second Embodiment]
(Configuration)

Figure 2:
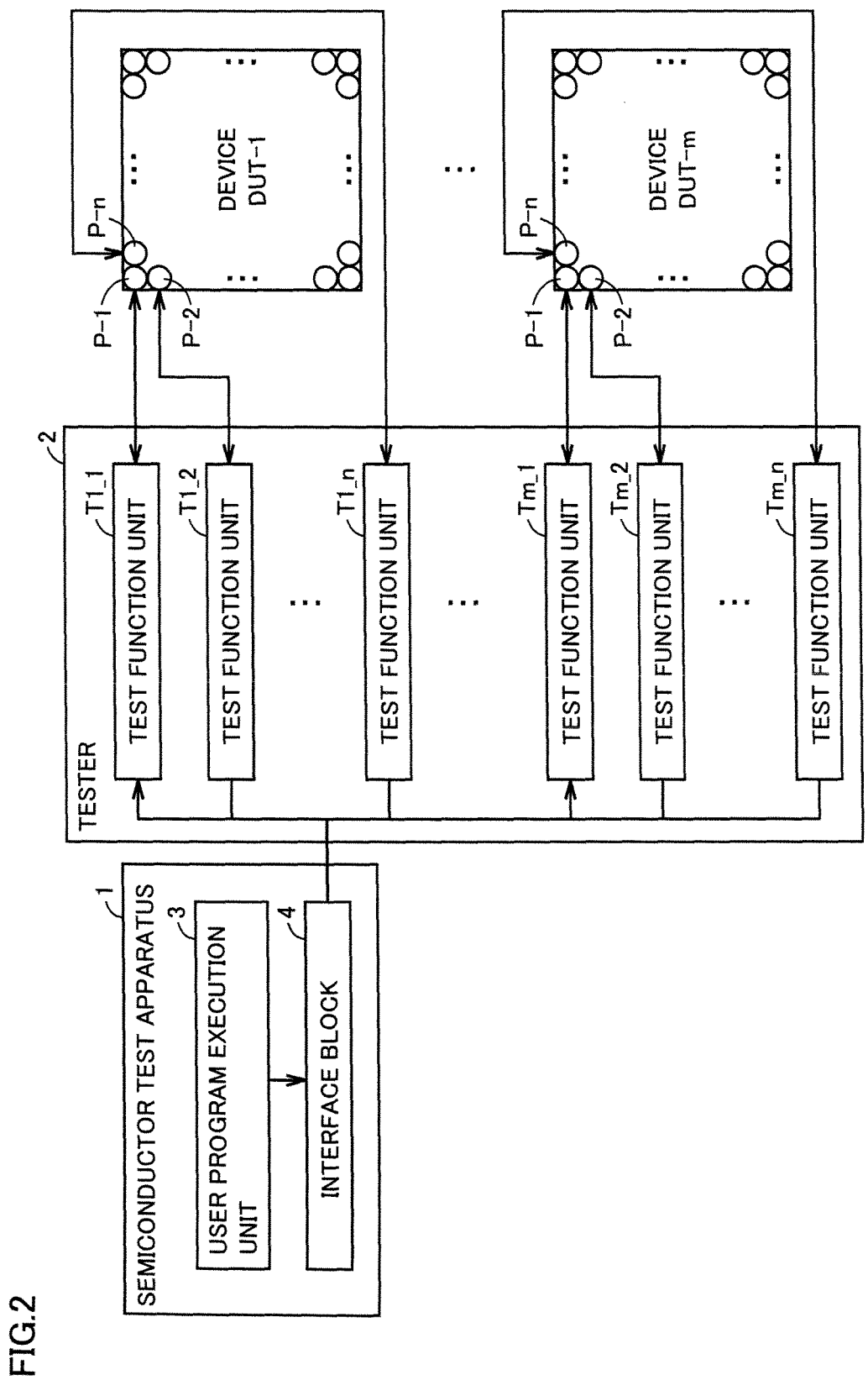
FIG. 2 is a diagram showing a test system in an embodiment of the present invention.

FIG. 2 is a diagram showing a test system in an embodiment of the present invention. The test system includes a semiconductor test apparatus 1, a tester 2, and m tested devices DUT1 to DUT-m each having n pins P-1 to P-n.

An instruction to be executed by tester 2 among instructions of the user program executed by user program execution unit 3 of semiconductor test apparatus 1 is sent to an interface block 4. Interface block 4 generates a tester instruction to be sent to each of pins P-1 to P-n of tested devices DUT- to DUT-m based on the received instruction and outputs the tester instruction to test function units T1_1 to T1_$n$, ... Tm_1 to Tm_n corresponding to each pin. Test function unit Ti_j (breach pin outputs a signal to pin P-j of corresponding tested device DUT-i and receives a signal from pin P-j of corresponding tested device DUT-i.

Figure 3:
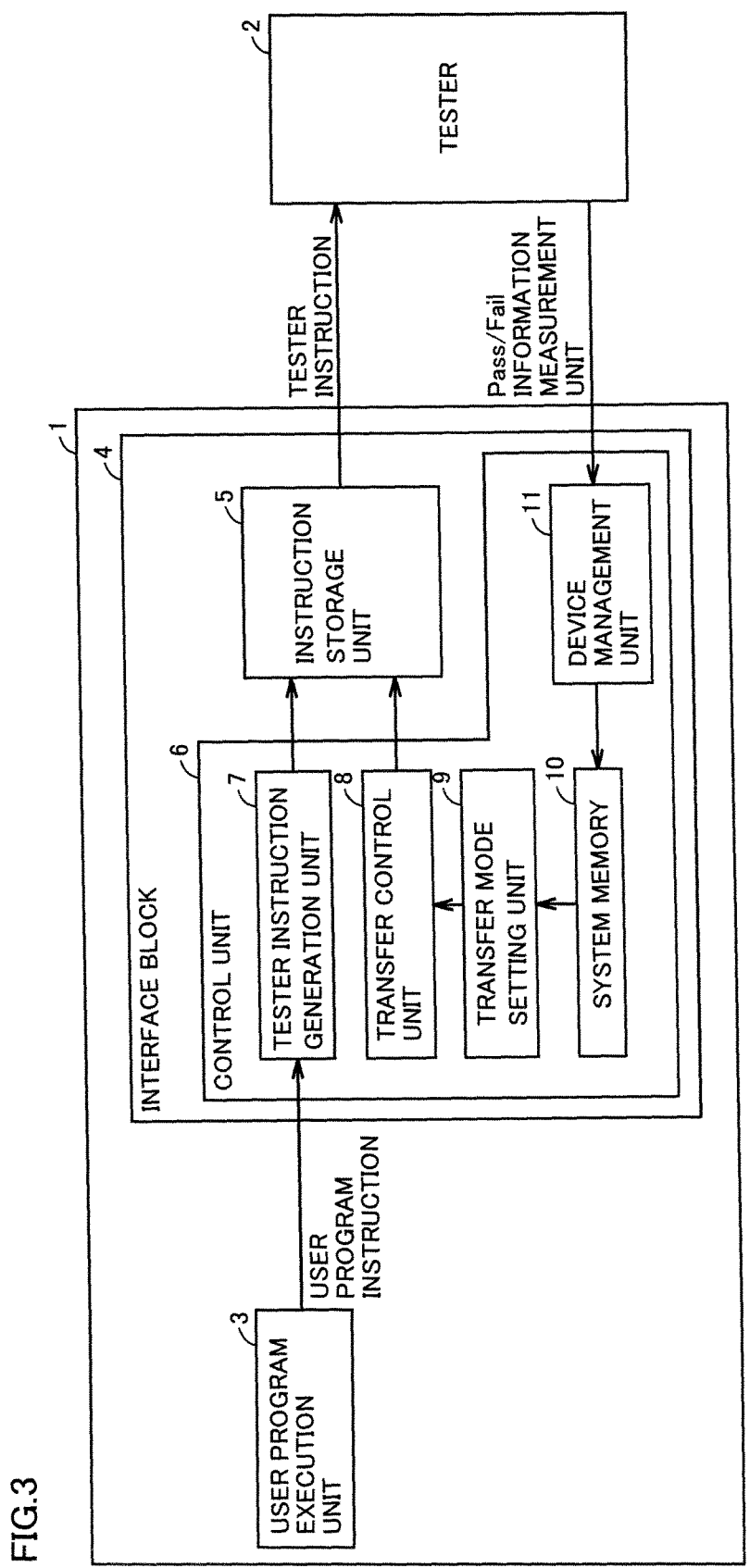
FIG. 3 is a diagram showing a configuration of a semiconductor test apparatus in a second embodiment.

FIG. 3 is a diagram showing a configuration of a semiconductor test apparatus in a second embodiment.

As shown in FIG. 3, this semiconductor test apparatus 1 includes user program execution unit 3 and interface block 4.

Interface block 4 includes an instruction storage unit and a control unit 6.

Control unit 6 includes a system memory 10, a tester instruction generation unit 7, a transfer mode setting unit 9, a transfer control unit 8, and a device management unit 11.

User program execution unit 3 executes an instruction of a user program

System memory 10 stores a list of abnormal devices among, the plurality of devices DUT-1 to DUT-m connected to tester 2.

Device management unit 11 identifies an abnormal device among the plurality of devices DUT-1 to DUT-m connected to tester 2 in accordance with a signal transmitted from tester 2 and updates the list of abnormal devices.

Figures 4, 5:
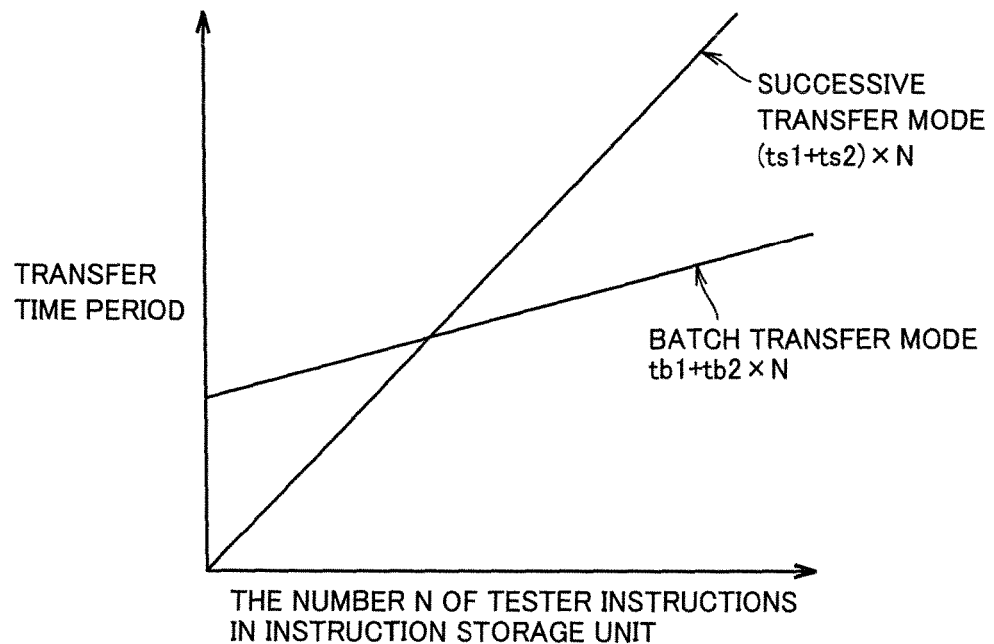
FIG. 4 is a diagram showing a configuration of a tester instruction.
FIG. 5 is a diagram showing relation of the number N or tester instructions in an instruction storage unit with a transfer time period TP1 in a successive transfer mode and a transfer time period TP2 in a batch transfer mode.

Tester instruction generation unit 7 generates tester instructions as many as terminals of normal device(s) among the plurality of devices DUT-1 to DUT-m connected to tester 2, by referring to the list of abnormal devices based on the instruction of the user program and causes instruction storage unit 5 to store the tester instructions. As shown in FIG. 4, the tester instruction is configured with a number of a device DUT, a port number, an address of a register of tester 2, and write data. One or a plurality of type(s) of tester instruction(s) is (are) generated from one instruction of the user program. Here, one type of tester instruction is a tester instruction identical in write data and different in a number of device DUT, a port number, and an address of a register of tester 2.

Instruction storage unit 5 has a plurality of registers each storing one tester instruction.

Transfer mode setting unit 9 compares (ts1+ts2)×N representing a transfer tune period TP1 in the successive transfer mode and tb1+tb2×N representing a transfer time period TP2 in the batch transfer mode with each other.

It is noted that ts1 represents a time period required for pre-processing for transfer in the successive transfer mode and ts2 represents a time period required for transfer of one tester instruction from instruction storage unit 5 to tester 2 in the successive transfer mode. tb1 represents a time period required for pre-processing for transfer in the bat& transfer mode and tb2 represents a time period required for transfer of one tester instruction from instruction storage unit 5 to tester 2 in the batch transfer mode. N represents the number of tester instructions in instruction storage unit 5. The batch transfer mode refers, for example, to transfer in a DMA (Direct Memory Access) mode.

FIG. 5 is a diagram showing relation of the number N of tester instructions in instruction storage unit 5 with transfer time period TP1 in the successive transfer mode and transfer time period TP2 in the batch transfer mode.

As shown in FIG. 5, when the number N of tester instructions in instruction storage unit 5, that is, the number of tester instructions to be transferred, is small, a transfer time period in the successive transfer mode is shorter. When the number N of tester instructions exceeds a certain number, a transfer time period in the batch transfer mode is shorter.

Transfer mode setting unit 9 sets the transfer mode to a mode shorter in transfer time period of the successive transfer mode and the batch transfer mode, based on the number N of tester instructions in instruction storage unit 5 when a pattern execution instruction is received from user program execution unit 3.

Transfer control unit 8 transfers the tester instructions in instruction storage unit 5 in accordance with the set transfer mode. Namely, transfer control unit 8 identifies a register which is a transfer destination, in accordance with a number of device DUT, a port number, and an address of the register of tester 2 included in the tester instruction, and transfers write data to the identified register.

Figure 6:
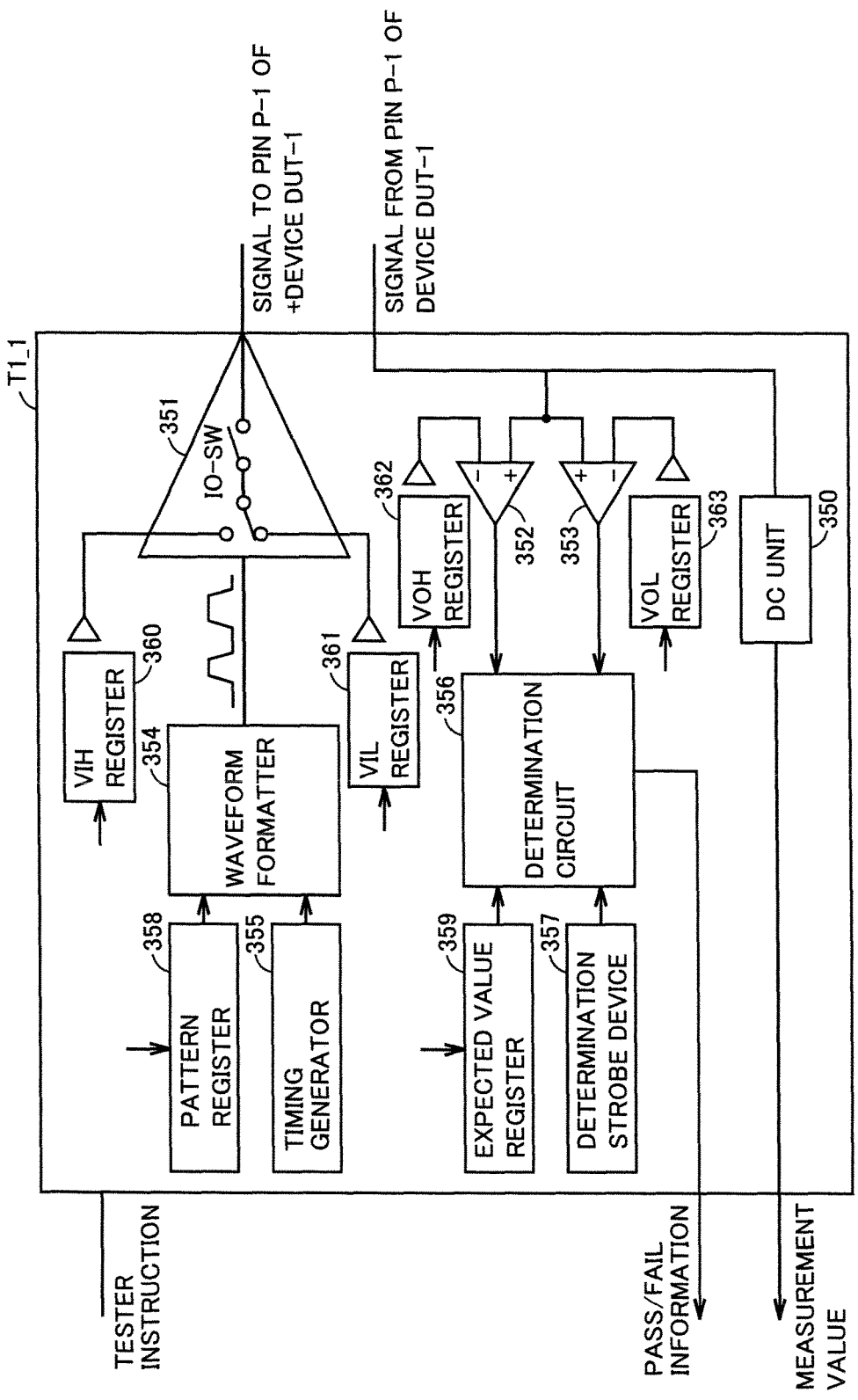
FIG. 6 is a diagram showing a configuration of a test function unit.

FIG. 6 is a diagram showing a configuration of test function unit T1_1. Since a configuration of other test function units Ti_j (i=2 to m, j=1 to n) is also the same as the configuration of test function unit T1_1 description will not be repeated.

Test function unit T1_1 includes a pattern register 358 holding a test pattern, a timing generator 355 outputting a timing signal to a waveform formatter 354, and waveform formatter 354.

In addition, test function unit T1_1 includes a driver 351 outputting a signal to pin P-1 of device DUT-1, a VIH register 360 holding a value of a high voltage to driver 351, and a VIL register 361 holding a value of a low voltage to driver 351.

Test function unit T1_1 further includes a VOH register 362 holding a value of a reference voltage to a negative terminal of a comparator 352 and comparator 352 comparing a signal from pin P-1 of device DUT-1 and the reference voltage output from VOH register 362 with each other and outputting a result of comparison to a determination circuit 356.

Test function unit T1_1 further includes a VOL register 363 holding a value of a reference voltage to a negative terminal of a comparator 353 and comparator 353 comparing the signal from pin P-1 of device DUT-1 and the reference voltage output from VOL register 363 with each other and outputting a result of comparison to determination circuit 356.

Test function unit T1_1 further includes an expected value register 359 holding an expected value, a determination strobe device 357 outputting a strobe signal to determination circuit 356, and determination circuit 356 making various determinations in accordance with the expected value in the expected value register, the result of comparison by comparator 352, and the result of comparison by comparator 353.

Test function unit T1_1 further includes a DC unit conducting a voltage test or a leakage test based on the signal from pin P-1 of device DUT-1.

(Operation)

Figure 7:
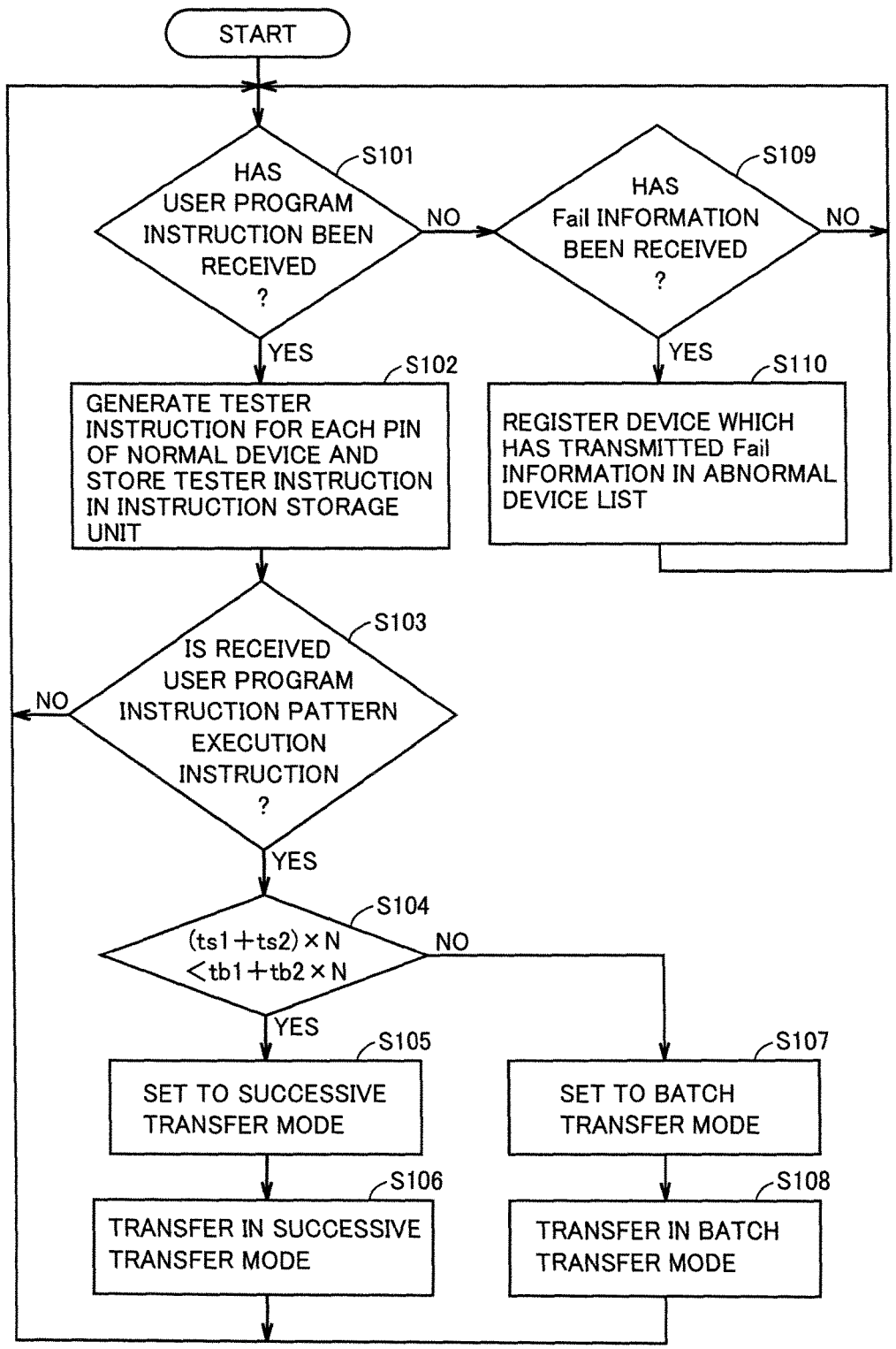
FIG. 7 is a flowchart showing an operation procedure of the semiconductor test apparatus in the first embodiment.

FIG. 7 is a flowchart showing an op ration procedure of the semiconductor test apparatus in the first embodiment.

Initially, when tester instruction generation unit 7 has received a user program instruction from user program execution unit 3 (YES in step S101), tester instruction generation unit 7 identifies normal device DUT by referring to a list of abnormal devices in system memory 10. Tester instruction generation unit 7 generates a tester instruction for each pin P of normal device DUT based on the user program instruction and causes instruction storage unit 5 to store the generated tester instruction (step S102).

On the other hand, when device management unit 11 has received from tester 2, Fail information that a test result indicates failure (YES in step S109), it registers a device which has transmitted that Fail information as an abnormal device in the list of abnormal devices in system memory 10 (step S110).

When the received user program instruction is a pattern execution instruction (YES in step S103), transfer mode setting unit 9 compares (ts1+ts2)×N representing transfer time period TP1 in the successive transfer mode and tb1+tb2×N representing transfer time period TP2 in the batch transfer mode with each other.

It is noted that ts1 represents a time period required for pre-processing for transfer in the successive transfer mode and ts2 represents a time period required for transfer of one tester instruction in the successive transfer mode. tb1 represents a time period required for pre-processing for transfer in the batch transfer mode and tb2 represents a time period required for transfer of one tester instruction in the batch transfer mode. N represents the number of tester instructions in instruction storage unit 5.

When relation of TP1<TP2 is satisfied (YES in step S104), transfer mode setting unit 9 sets the transfer mode to the successive transfer mode (step S105).

Then, transfer control unit 8 transfers all tester instructions in instruction storage unit S to tester 2 in the successive transfer mode (step S106).

On the other hand, when relation of TP1≥TP2 is satisfied (NO in step S104), transfer mode setting unit 9 sets the transfer mode to the batch transfer mode (step S107).

Then, transfer control unit 8 transfer all tester instructions in instruction storage unit 5 to tester 2 in the batch transfer mode (step S108).

(Example)

FIG. 8A is a diagram showing an example of a user program.

As shown in FIG. 8A, the user program includes a plurality of test items.

FIG. 8B is a diagram showing an instruction included in a test 1 which is a function test.

As shown in FIG. 8B, a function test consists of voltage setting, timing setting, pin setting, relay setting, and a pattern execution instruction.

FIG. 8C is a diagram showing an instruction included in a test 2 which is a Flash test (a test of a flash memory).

As shown in FIG. 8C, the Flash test consists of voltage setting, timing setting, pin setting, relay setting, and a pattern execution instruction.

FIG. 9 is a diagram showing an example of a tester instruction stored in instruction storage unit 5 when no abnormal device is present.

As shown in FIG. 9, when the number of devices DUT is n and the number of pins P in each device DUT is m, n×m tester instructions of the same type are generated.

When the pattern execution instruction is received and the tester instructions in FIG. 9 are stored in instruction storage unit 5, all tester instructions in FIG. 9 are transferred to tester 2 in the successive transfer mode or the batch transfer mode.

FIG. 10 is a diagram showing an example of a tester instruction stored in instruction storage unit 5 when an abnormal device is present.

As shown in FIG. 10, when the number of devices DUT is n and five of them are abnormal devices and when the number of pins P in each device DUT is m, (n−5)×m tester instructions of the same type are generated.

When the pattern execution instruction is received and the tester instructions in FIG. 10 are stored in instruction storage unit 5, all tester instructions in FIG. 10 are transferred to tester 2 in the successive transfer mode or the batch transfer mode.

As above, according to the present embodiment, the mode for transferring the tester instruction from the semiconductor test apparatus to the tester can be switched to a mode shorter in transfer time period.

[Third Embodiment]

In a third embodiment, user program execution unit 3 executes a user program including a switching flag. User program execution unit 3 outputs a batch transfer switching instruction for a code of FLAG=ON included in the user program. User program execution unit 3 outputs a successive transfer switching instruction for a code of FLAG=OFF included in the user program.

Thus, regarding a test which may he compromised by hatch transfer, a user can insert FLAG=OFF before that test of the user program. On the other hand, regarding a test which is compromised in spite of hatch transfer, the user can insert FLAG=ON before that test of the user program.

When transfer mode setting unit 9 receives the batch transfer switching instruction from user program execution unit 3, transfer mode setting unit 9 sets the transfer mode to the batch transfer mode. When transfer mode sating unit 9 receives the successive transfer switching instruction from user program execution unit 3, transfer mode setting unit 9 sets the transfer mode to the successive transfer mode When the successive transfer mode has been set, each time of reception of an instruction from user program execution unit 3, transfer control unit 8 transfers the tester instruction stored in instruction storage unit 5 including the tester instruction generated in response to that reception to tester 2 in the successive transfer mode.

Alternatively, when the batch transfer mode has been set, each time of reception of the pattern execution instruction from user program execution unit 3, transfer control unit 8 transfers the tester instruction stored in instruction storage unit 5 including the tester instruction generated in response to that reception to tester 2 in the batch transfer mode.

Figure 11:
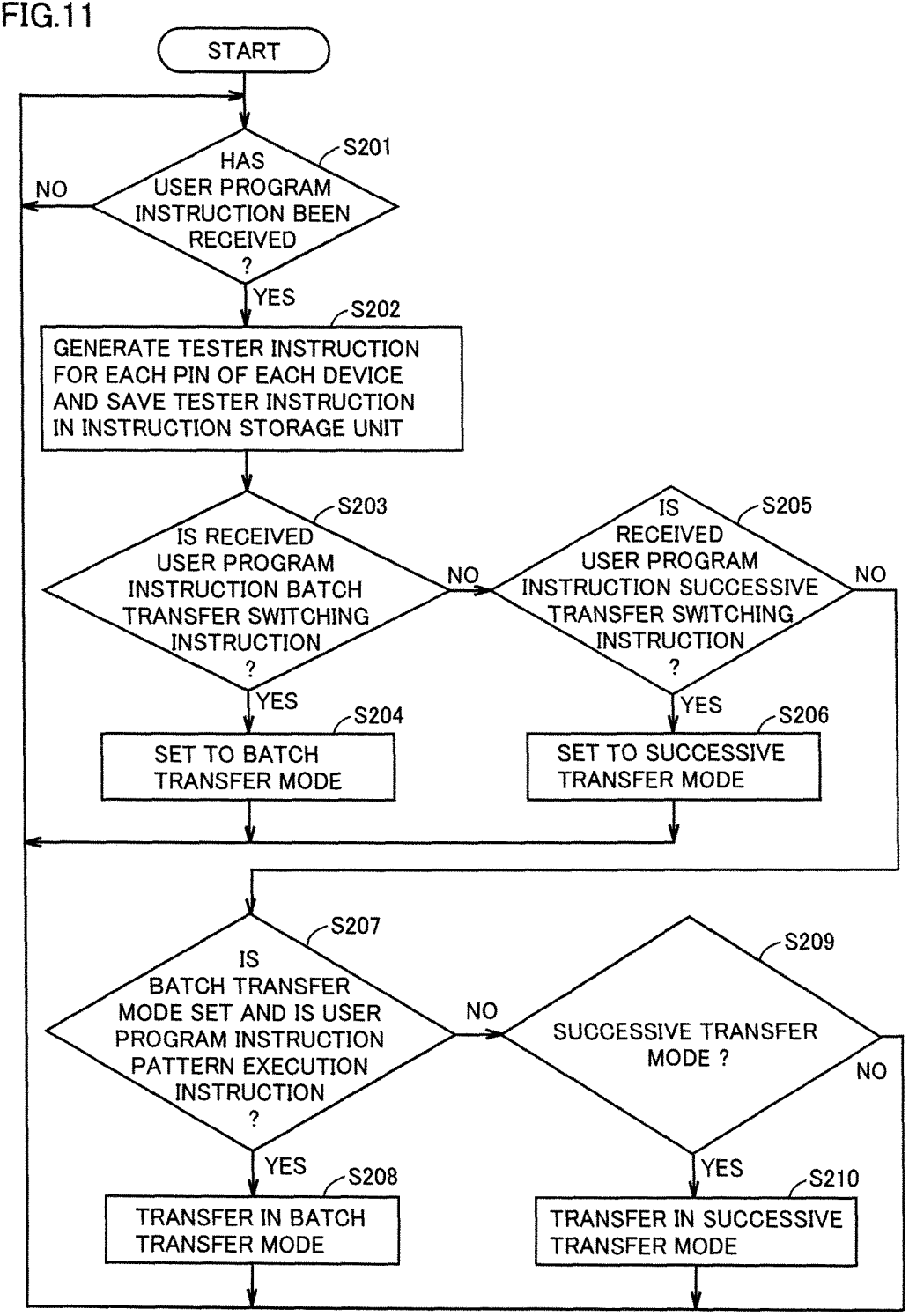
FIG. 11 is a flowchart showing an operation procedure of the semiconductor test apparatus in a third embodiment.

FIG. 11 is a flowchart showing an operation procedure of the semiconductor test apparatus in the third embodiment.

Referring to FIG. 11, when tester instruction generation unit 7 has received a user program instruction from user program execution unit 3 (YES in step S201), tester instruction generation unit 7 generates a tester instruction for each pin P of each device DUT based on the user program instruction and causes instruction storage unit 5 to store the generated tester instruction (step S202).

When the received user program instruction is the batch transfer switching instruction (YES in step S203), transfer mode setting unit 9 sets the transfer mode to the batch transfer mode (step S204).

When the received user program instruction is the successive transfer switching instruction (YES in step S205), transfer mode setting unit 9 sets the transfer mode to the successive transfer mode (step S206).

When the transfer mode is set to the batch transfer mode and the received user program instruction is the pattern execution instruction (YES in step S207), transfer control unit 8 transfers all tester instructions in instruction storage unit 5 to tester 2 in the batch transfer mode (step S208).

When the transfer mode is set to the successive transfer mode (YES in step S209), transfer control unit 8 transfers all tester instructions in instruction storage unit 5 to tester 2 in the successive transfer mode (step S210).

(Example)

FIG. 12A is a diagram showing an example of the user program.

FIG. 12B is a diagram showing an example of test 1 included in the user program.

Test 1 is a function test. In the function test, setting of a voltage, timing, a pin, and a relay is made for tested device DUT, and a test pattern loaded in advance to tester 2 is executed simultaneously with execution of a pattern. Since the function test includes only instructions which are not compromised in spite of transfer in the batch transfer mode, setting to a switching flag FLAG=ON is made before test 1, and user program execution unit 3 outputs the batch transfer switching instruction. Transfer mode setting unit 9 receives the batch transfer switching instruction from user program execution unit 3 and sets the transfer mode to the batch transfer mode.

FIG. 12C is a diagram showing an example of test 2 included in the user program.

Test 2 is a trimming test. In the trimming test, for a voltage, timing, a pin, and a relay, setting similar to that in the function test is required. Thereafter, a trimming code is created and written in tested device DUT, a test pattern is executed, and a measurement value for the written trimming code is obtained by conducting a DC test. In order to obtain a trimming code of which measurement value is closest to a target value, the processing above is repeated. A value for the trimming code of which finally determined measurement value is closer to the target value is written in tested device DUT.

Since the trimming test includes an instruction which is compromised in the case of transfer in the batch transfer mode (creation of a new trimming code, writing of a trimming code, comparison between a measurement value and a target value, determination of a trimming code), setting to a switching flag FLAG=OFF is made before test 2 and user program execution unit 3 outputs the successive transfer switching instruction. Transfer mode setting unit 9 receives the successive transfer switching instruction from user program execution unit 3 and sets the transfer mode to the successive transfer mode.

As above, according to the present embodiment, the user cart set by using the user program, the mode for transferring the tester instruction from the semiconductor test apparatus to the tester. As the user sets an instruction which is compromised by batch transfer to the successive transfer mode, a test of a device can accurately be conducted.

[Fourth Embodiment]

In a fourth embodiment, when a tester instruction generated based on an instruction received from user program execution unit 3 includes a bus read instruction, transfer mode setting unit 9 sets the transfer mode to the batch transfer mode.

Bus read is executed when some information is read from tester 2. As the premise, unless a tester instruction in instruction storage unit 5 is bus-transferred before reading and reflected as the setting for tester 2, a correct read value is not obtained. In order to solve these problems in a test flow including bus read, transfer in the batch transfer mode is forcibly carried out before a unit at which bus read is required.

Figure 13:
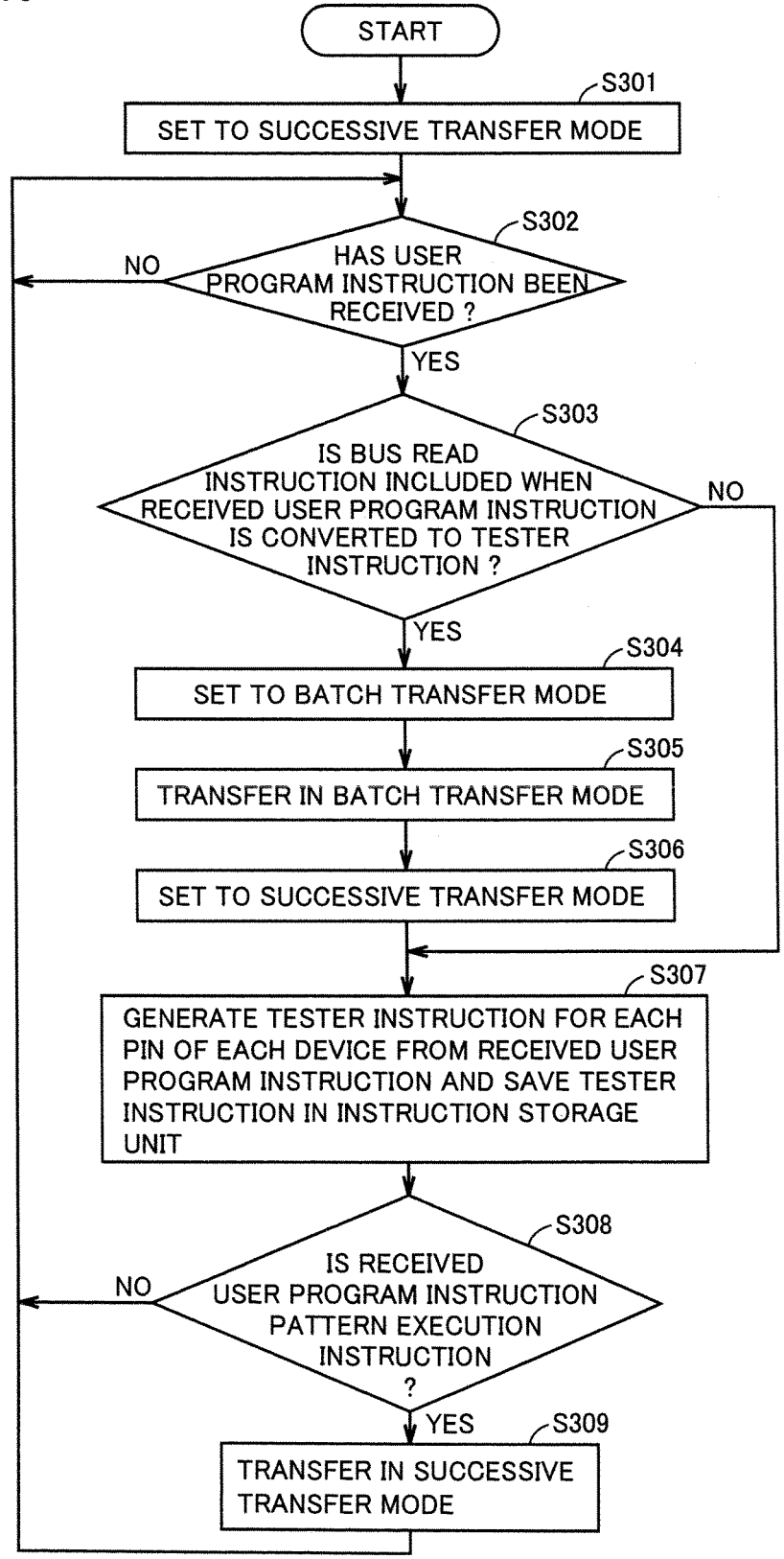
FIG. 13 is a flowchart showing an operation procedure of the semiconductor test apparatus in a fourth embodiment.

FIG. 13 is a flowchart showing an operation procedure of the semiconductor test apparatus in the fourth embodiment.

Initially, transfer mode setting unit 9 sets the transfer mode to the successive transfer mode (step 301).

When transfer mode setting unit 9 has received a user program instruction from user program execution unit 3 (YES in step S302) and when the received user program instruction has been converted to a tester instruction, transfer mode setting unit 9 determines whether or not the tester instruction includes a bus read instruction.

When the tester instruction includes a bus read instruction (YES in step S303), transfer mode setting unit 9 sets the transfer mode to the batch transfer mode (step S304).

Then, transfer control unit 8 transfers all tester instructions in instruction storage unit 5 to tester 2 in the batch transfer mode (step S305).

Then, transfer mode setting unit 9 sets the transfer mode to the successive transfer mode (step S306).

In a case of NO in step S303 or after step S306, tester instruction generation unit 7 generates a tester instruction for each pin P of each device DUT based on the received user program instruction, and causes instruction storage unit 5 to store the generated tester instruction (step S307).

Then, when the received user program instruction is a pattern execution instruction (YES in step S308), transfer control unit 8 transfers all tester instructions in instruction storage unit 5 to tester 2 in the successive transfer mode (step S309).

FIG. 14A is a diagram showing an example of the user program.

FIG. 14B is a diagram showing an example of test 1 included in the user program.

Test 1 is a function test. Since the function test does not include an instruction generating a bus read instruction, transfer mode setting unit 9 does not set the batch transfer mode.

FIG. 14C is a diagram showing an example of test 2 included in the user program.

Test 2 is a trimming test.

Since the trimming test includes an instruction generating a bus read instruction (writing of a trimming code, a DC test), when transfer mode setting unit 9 receives these instructions, transfer mode setting unit 9 sets the transfer mode to the batch transfer mode.

As above, according to the present embodiment, by setting tester instructions in the instruction storage unit to the batch transfer mode before tester instructions (bus read instructions) which are compromised in the case of successive transfer from the semiconductor test apparatus to the tester, a test of a device can accurately be conducted.

Though successive transfer has been carried out in step S309 when determination as YES is made in step S308 in the present embodiment, limitation thereto is not intended. When determination as YES is made in step S308, as in the first embodiment, the processing in steps S104 to S108 in FIG. 7 may be performed.

[Fifth Embodiment]

In a Fifth embodiment, system memory 10 stores a test item of which test has failed in any of devices DUT1 to DUT-n in transfer in the batch transfer mode in a second pretest, as a test item in the successive transfer mode.

In addition, system memory 10 stores a test item of which first measurement value obtained in a test in devices DUT-1 to DUT-n in transfer in the successive transfer mode in a first pretest and second measurement value obtained in a test in devices DUT1 to DUT-n in the batch transfer mode in the second pretest are different from each other by a prescribed value or more, as the test item in the successive transfer mode.

Transfer mode setting unit 9 sets a mode for transferring a tester instruction generated from an instruction included the test item stored in system memory 10 to the successive transfer mode.

FIG. 15 is a flowchart showing a procedure for registering a transfer mode for each test item in the semiconductor test apparatus in the fifth embodiment.

Initially, transfer mode setting unit 9 sets the successive transfer mode for the first pretest (step S401).

Then, tester instruction generation unit 7 generates a tester instruction for each pin P of each device DUT based on each user program instruction from user program execution unit 3 and causes instruction storage unit 5 to store the generated tester instruction. Transfer control unit 8 transfers all tester instructions in instruction storage unit 5 to tester 2 in the successive transfer mode (step S402).

Device management unit 11 receives a measurement value a for each test item of each pin P of each device DUT, which is sent from tester 2, and causes system memory 10 to store the measurement value (step S403).

Then, transfer mode setting unit 9 sets the batch transfer mode (step S404).

Then, tester instruction generation unit 7 generates a tester instruction for each pin P of each device DUT based on each user program instruction from user program execution unit 3 and causes instruction storage unit 5 to store the generated tester instruction. Transfer control unit 8 transfers all tester instructions in instruction storage unit 5 to tester 2 in the batch transfer mode (step S405).

Device management unit 11 receives Pass/Fail information and measurement value b for each test item of each pin P of each device DUT sent from tester 2, and causes system memory 10 to store them (step S406).

When there is a test item for which Fail information from any pin P of any device DUT has been received in the batch transfer mode (YES in step S407), device management unit 11 writes the test item for which Fail information has been received in system memory 10 as the test item in the successive transfer mode (step S408).

When there is a test item of which difference between measurement value b received in the batch transfer mode and measurement value a received in the successive transfer mode is equal to or greater than a prescribed value for any pin P of any device DUT (YES in step S409), device management unit 11 writes the test item of which difference is equal to or greater than the prescribed value in system memory 10 as the test item in the successive transfer mode (step S410).

Figure 16:
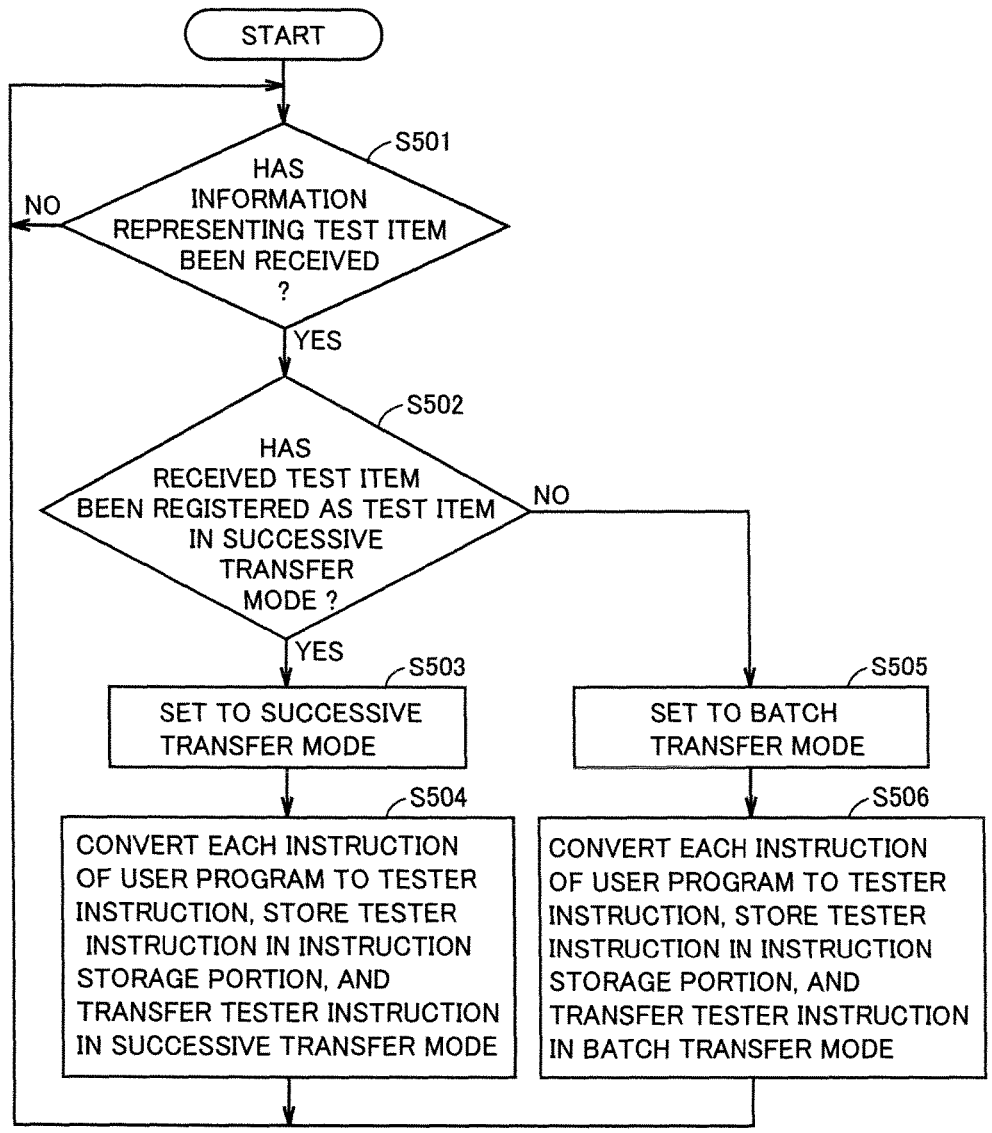
FIG. 16 is a flowchart showing a procedure for transfer control of the semiconductor test apparatus in the fifth embodiment.

FIG. 16 is a flowchart showing a procedure for transfer control of the semiconductor test apparatus in the fifth embodiment.

Initially, when transfer mode setting unit 9 has received information representing a test item from user program execution unit 3 (YES in step S501) and when the test item represented by the received information has been stored as the test item in the successive transfer mode in system memory 10 (YES in step S502), transfer mode setting unit 9 sets the transfer mode to the successive transfer mode (step S503).

Tester instruction generation unit 7 generates a tester instruction for each pin P of each device DUT based on each user program instruction from user program execution unit 3 and causes instruction storage unit 5 to store the generated tester instruction. Each time of reception of each user program instruction, transfer control unit 8 transfers all tester instructions in instruction storage unit 5 to tester 2 in the successive transfer mode (step S504).

On the other hand, when the test item represented by the received information has not been registered to be in the successive transfer mode in setting information in system memory 10 (NO in step S502), the transfer mode is set to the batch transfer mode (step S505).

Tester instruction generation unit 7 generates a tester instruction for each pin P of each device DUT based on each user program instruction from user program execution unit 3 and causes instruction storage unit 5 to store the generated tester instruction. Each time of reception of all user program instructions included in the test item represented by the received information, transfer control unit 8 transfers all tester instructions M instruction storage unit 5 to tester 2 in the batch transfer mode (step S506).

Figures 17A, 17B:
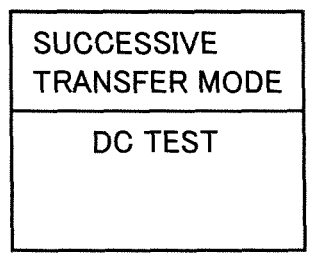
FIG. 17A is a diagram showing a test item included in file user program.
FIG. 17B is a diagram showing an example of a test item in a successive transfer mode stored in a system memory.

FIG. 17A is a diagram showing a test item included in the user program.

The user program includes test 1 which is a function test, test 2 which is a trimming test, a test 3 which is a DC test, and a test 4 which is a self test.

FIG. 17B is a diagram showing an example of a test item in the successive transfer mode stored in system memory 10. In the example in FIG. 17B, only the DC test is stored in system memory 10 as the test item in the successive transfer mode. Therefore, a tester instruction generated from an instruction of the DC test is transferred in the successive transfer mode, while a tester instruction generated from an instruction of other test items is transferred in the batch transfer mode.

As above, according to the present embodiment, since a test instruction generated from an instruction of a test item which is compromised in the case of batch transfer from the semiconductor test apparatus to the tester is transferred in the successive transfer mode, a test of a device can accurately be conducted.

Though the invention made by the present inventor has specifically been described above based on the embodiments, naturally, the present invention is not limited to the embodiments and can variously be modified without departing from the gist thereof.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor test apparatus for controlling a tester to which a plurality of devices are connected, comprising:
   a user program execution unit executing an instruction of a user program;
   an instruction generation unit generating tester instructions for terminals of the plurality of devices connected to said tester based on the instruction of said user program;
   an instruction storage unit storing generated said tester instructions;
   a transfer mode setting unit setting a transfer mode to either a successive transfer mode or a batch transfer mode based on one of the instruction of said user program and information on how many tester instructions are stored in said instruction storage unit;
   a transfer control unit transmitting the tester instructions in said instruction storage unit to said tester in accordance with set said transfer mode;
   a memory storing a list of abnormal devices among the plurality of devices connected to said tester; and
   a device management unit identifying an abnormal device among the plurality of devices connected to said tester in accordance with a signal transmitted from said tester and updating the list of said abnormal devices, wherein
   said instruction generation unit generates the tester instructions as many as terminals of a normal device among the plurality of devices connected to said tester, by referring to the list of said abnormal devices based on the instruction of said user program,
   said transfer mode setting unit sets the transfer mode to a mode shorter in transfer time period of the successive transfer mode and the batch transfer mode based on the information on how many tester instructions are stored in said instruction storage unit, and
   the transfer time period of the successive transfer mode is (ts1+ts2)×N and the transfer time period of the successive transfer mode is tb1+tb2×N, in which ts1 represents a time period required for pre-processing for transfer in the successive transfer mode, ts2 represents a time period required for transfer of one tester instruction from said instruction storage unit to said tester in the successive transfer mode, tb1 represents a time period required for pre-processing for transfer in the batch transfer mode, tb2 represents a time period required for transfer of one tester instruction from said instruction storage unit to said tester in the batch transfer mode, and N represents the information on how many tester instructions are stored in said instruction storage unit.

2. The semiconductor test apparatus according to claim 1, wherein
   said transfer mode setting unit sets said transfer mode when said transfer mode setting unit receives a pattern execution instruction from said user program execution unit.

3. The semiconductor test apparatus according to claim 1, comprising a test item storage unit storing a test item of which test in said device has failed in said batch transfer mode, wherein
   said transfer mode setting unit sets the transfer mode for the tester instructions generated from an instruction included in the test item stored in said test item storage unit to said successive transfer mode.

4. The semiconductor test apparatus according to claim 3, wherein
   said transfer mode setting unit sets the transfer mode for the tester instructions generated from the instruction included in said user program in a pretest to said batch transfer mode, and
   said device management unit identifies a test item which has failed in accordance with a signal transmitted from said tester and writes identified said test item in said test item storage unit.

5. The semiconductor test apparatus according to claim 1, comprising a test item storage unit storing a test item of which first measurement value obtained in a test in said device in said successive transfer mode and second measurement value obtained in a test in said device in said batch transfer mode are different from each other by a prescribed value or more, wherein
   said transfer mode setting unit sets the transfer mode for the tester instructions generated from an instruction of the test item stored in said test item storage unit to said successive transfer mode.

6. The semiconductor test apparatus according to claim 5, wherein
   said transfer mode setting unit sets the transfer mode for the tester instructions generated from the instruction included in said user program in a first pretest to said successive transfer mode,
   said device management unit writes said first measurement value of each test item in said test item storage unit in accordance with a signal transmitted from said tester,
   said transfer mode setting unit sets the transfer mode for the tester instructions generated from the instruction included in said user program in a second pretest to said batch transfer mode,
   said device management unit writes said second measurement value of each test item in said test item storage unit in accordance with a signal transmitted from said tester, and
   said device management unit writes the test item of which said first measurement value and said second measurement value are different from each other by the prescribed value or more in said test item storage unit.

* * * * *